US009204081B2

(12) United States Patent
Strater et al.

(10) Patent No.: US 9,204,081 B2
(45) Date of Patent: Dec. 1, 2015

(54) METHOD AND APPARATUS FOR DETECTION OF CABLE AND OFF-AIR SIGNALS IN A DUAL OR HIGHER TUNER SET-TOP TERMINAL (75) Inventors: Jay W. Strater, Jamison, PA (US); Thomas L. DuBreuil, Ivyland, PA (US); David C. Goodwin, Holland, PA (US)

(73) Assignee: ARRIS Technology, Inc., Suwanee, GA (US)

( * ) Notice: Subject to any disclaimer, the term of this patent is extended or adjusted under 35 U.S.C. 154(b) by 88 days.

(21) Appl. No.: 12/344,984

(22) Filed: Dec. 29, 2008

(65) Prior Publication Data
US 2010/0165214 A1 Jul. 1, 2010

(51) Int. Cl.
*H04N 5/50* (2006.01)
*H04N 21/426* (2011.01)

(52) U.S. Cl.
CPC ............. *H04N 5/50* (2013.01); *H04N 21/4263* (2013.01)

(58) Field of Classification Search
USPC .......................................................... 725/37
See application file for complete search history.

(56) References Cited

U.S. PATENT DOCUMENTS

| 2004/0055006 | A1* | 3/2004 | Iwamura | 725/37 |
| 2006/0025092 | A1* | 2/2006 | Sanders et al. | 455/161.1 |
| 2008/0178215 | A1* | 7/2008 | Nishigaki | 725/38 |
| 2009/0158368 | A1* | 6/2009 | Cirrincione et al. | 725/110 |

OTHER PUBLICATIONS

"Cable Television Channel Identification Plan—CEA Standard", CEA-542-C, Consumer Electronics Association, Technology & Standards Department, Feb. 2009.

* cited by examiner

*Primary Examiner* — Justin Shepard
(74) *Attorney, Agent, or Firm* — Stewart M. Wiener (57) ABSTRACT Systems and methods are provided for minimizing cable and off-air signal detection on separate cable and off-air input jacks in a set-top terminal with two or more tuners. The systems and methods employ logic to progress through different scan configurations with different input jack/signal detection assignments to minimize signal detection delay. Tuners are pooled for a given input jack/signal assignment, scanned frequencies are queued and carried to the next scan configuration, and user input is employed, whenever possible. The systems and methods are of particular value for retail applications, where users may install cable, off-air, or both sources incorrectly to their set-top terminal's cable and off-air input jacks.

22 Claims, 3 Drawing Sheets

METHOD AND APPARATUS FOR DETECTION OF CABLE AND OFF-AIR SIGNALS IN A DUAL OR HIGHER TUNER SET-TOP TERMINAL

FIELD OF THE INVENTION

The invention relates to connecting set-top boxes or terminals to signal-carrying inputs, and scanning and detection of the signals thereon.

BACKGROUND

Transmissions of signals for television generally occur over the air, over cable lines, or using satellite transmissions. These signals have a carrier frequency on which the video and audio data are carried. A suitable set-top terminal may be employed to receive any of these, by demodulating the carrier frequency to reconstruct the video and audio data. In particular, the set-top terminal includes a tuner that has a decoder with an adjustable narrow band pass filter, and the filter passes the signals of a selected channel to a video decoder.

A set-top terminal receives these signals when a user attaches one or more cables carrying these signals into the same. However, the set-top terminal does not know a priori what type and format of signal is being propagated by the attached cable. And if multiple jacks are provided on the set-top terminal to accommodate multiple types of signals, a user can easily attach the cables incorrectly, e.g., a user can inadvertently attach a cable carrying one type of a signal to a jack intended for a different type of signal.

The signal carried on a cable may be in one of several standardized formats, denoted cable channel identification standards: one is the "standard frequencies" standard (STD); a second is the "harmonic related carriers" standard (HRC); and a third is the "incremental related carriers" standard (IRC). Cable companies generally use one of these three standards, and set-top terminals provided by cable companies are usually programmed to the standard set by that company. However, it is common now for a consumer to be able to receive cable broadcasts from a number of cable companies, and each may employ a different standard. Moreover, it is common for consumers to purchase set-top terminals of their own, e.g., ones with digital video recording capabilities, and these are generally not hard-coded to a given cable company's standard. Even more, many set-top terminals may also receive off-air signals, and thus are required to be able to decode those signals as well.

To identify the signals carried by an attached coax cable, a scan is required to be made of the cable. However, conducting cable scans to detect signals over all possible channel frequencies and modulations is time-consuming given the large number of channels to scan, as well as the different standards. Accordingly, there is a need for an optimized method to rapidly detect ones of multiple types of signals that may be present on a signal-carrying cable.

SUMMARY

In one aspect, the invention is directed towards a method for scanning signals received by a set-top terminal. In one implementation, the set-top terminal has a cable input jack for receiving cable signals, an off-air input jack for receiving off-air signals, and at least four tuners. The method includes scanning the off-air input jack with a first tuner for a series of cable channels, scanning the off-air input jack with a second tuner for a series of off-air channels, scanning the cable input jack with a third tuner for a series of cable channels, and scanning the cable input jack with a fourth tuner for a series of off-air channels. The set-top terminal may also be implemented with dual tuners, three tuners, or more than four tuners, and such implementations are described below. For example, if the set-top terminal includes dual tuners instead of quad tuners, the first series of scans includes scanning the off-air input jack with a first tuner for a series of off-air channels, and scanning the cable input jack with a second tuner for a series of cable channels.

In some cases, user input may be received, indicating that a user has attached signal carriers to the cable input jack and the off-air input jack.

In another aspect, user input is received, where the user input indicates that a user has attached only one signal carrier to the cable input jack or to the off-air input jack. In this case, a first series of scans is performed, where the first series includes scanning the respective cable input jack or off-air input jack for a series of cable channels, and also scanning the respective cable input jack or off-air input jack for a series of off-air channels.

In a further aspect, the invention is directed towards a set-top terminal, which has a cable input jack for receiving cable signals, an off-air input jack for receiving off-air signals, and at least four tuners. The set-top terminal also has a user interface for receiving a user input. A processor included in the set-top terminal is configured to perform a first series of scans if the user interface has received no user input or if the user interface indicates that a user has attached signal carriers to both the cable and off-air input jacks. The first series of scans includes scanning the off-air input jack with a first tuner for a series of cable channels, scanning the off-air input jack with a second tuner for a series of off-air channels, scanning the cable input jack with a third tuner for a series of cable channels, and scanning the cable input jack with a fourth tuner for a series of off-air channels. If the set-top terminal includes dual tuners instead of quad tuners, the first series of scans includes scanning the off-air input jack with a first tuner for a series of off-air channels, and scanning the cable input jack with a second tuner for a series of cable channels.

In yet another aspect, the invention is directed towards a computer-readable medium, encoded with instructions for causing a set-top terminal to perform the above methods. In yet a further aspect, the invention is directed towards a computer-readable medium, encoded with instructions for configuring a set-top terminal in the above way.

DETAILED DESCRIPTION

Aspects of the disclosed systems and methods provide for a rapid detection of cable and off-air signals in a quad or higher tuner set-top terminal, in particular in the case where the set-top terminal allows for the flexibility of receiving cable and off-air television signals over separate inputs, e.g., via separate input jacks, which may be coaxial cable input jacks or the like. The systems and methods are designed to accommodate situations, and to detect and report to the user, where the user has misconnected the inputs. For example, where the user has connected an off-air signal carrier to a cable input jack, or vice versa, rather than connecting an off-air signal carrier to an off-air input jack and a cable signal carrier to a cable input connection. The systems and methods may be employed to provide the user with status information about the installation, allowing them to reconfigure the connections should they have intended a different installation. The systems and methods employ logic to progress through different scan configurations to minimize delays involved in signal detection. Whenever possible, tuners are pooled, scanned frequencies are queued and carried to the next scan configuration, and user input is employed.

Figure 1:
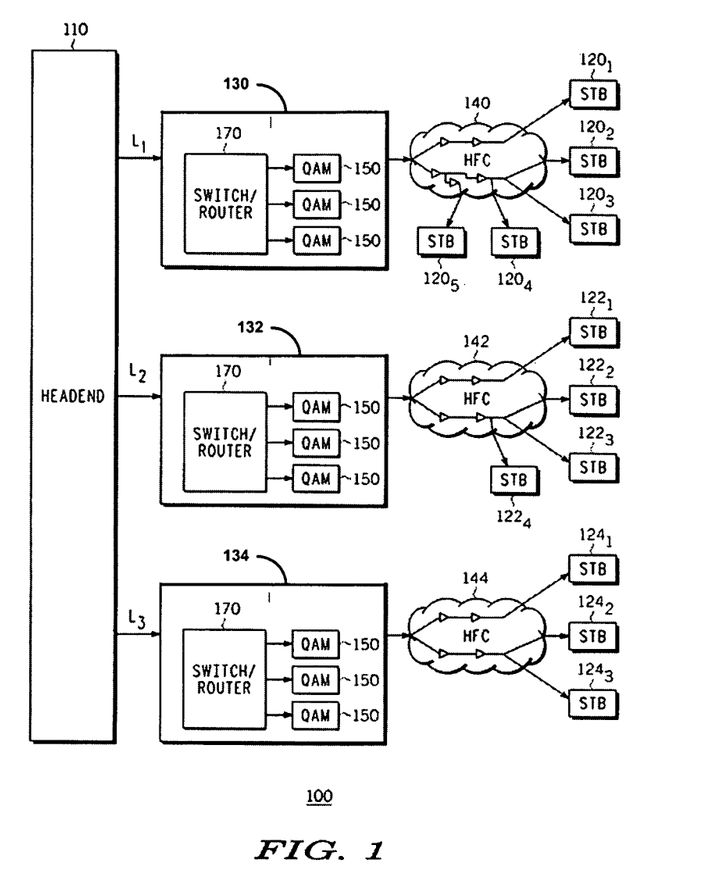
FIG. 1 shows one example of a content delivery system suitable for use in accordance with an embodiment.

Turning now to the drawings, where like numerals designate like components, FIG. 1 shows a content delivery system architecture 100 for delivering both broadcast channels and switched digital channels to a subscriber. Among other components, system architecture 100 comprises a content distribution source such as a headend 110 that is connected to multiple intermediate entities such as hubs 130, 132 and 134. The headend 110 communicates with a switch or router 170 in hubs 130, 132 and 134 over links L1, L2 and L3, respectively. The headend 110 and hubs 130, 132, and 134 may communicate over a packet-switched network such as a cable data network, passive optical network (PON) or the like using, for example, IP multicast addressing.

Some or even all of the hubs are connected to multiple users, typically via distribution networks such as local cable access networks (e.g., HFC networks). For simplicity of explanation only, each hub is shown as being connected to a distinct HFC network, which in turn communicates with end user equipment as illustrated. In particular hubs 130, 132 and 134 in FIG. 1 communicate with access networks 140, 142 and 144, respectively. Each access network 140, 142 and 144 in turn communicates with multiple end user devices such as set top or subscriber terminals. In the example of FIG. 1, access network 140 communicates with set-top terminals $120_1$, $120_2$, $120_3$, $120_4$ and $120_5$, access network 142 communicates with set-top terminals $122_1$, $122_2$, $122_3$ and $124_4$, and access network 144 communicates with set-top terminals $124_1$, $124_2$ and $124_3$.

In addition to the switch or router 170, each hub can include an array of radio frequency transmitter edge devices such as edge QAM modulators 150. The number of edge devices 150 in each hub may vary as needs dictate. As used herein, the term "QAM" refers to modulation schemes used for sending signals over cable access networks. Such modulation schemes might use any constellation level (e.g. QAM-16, QAM-64, QAM-256 etc.) depending on the details of a cable access network. A QAM may also refer to a physical channel modulated according to such schemes. Typically, a single QAM modulator can output a multiplex of ten or twelve programs, although the actual number will be dictated by a number of factors, including the communication standard that is employed. The edge QAM modulators usually are adapted to: (i) receive Ethernet frames that encapsulate the transport packets, (ii) de-capsulate these frames and remove network jitter, and (iii) transmit radio frequency signals representative of the transport stream packets to end users, over the HFC network. Each transport stream is mapped to a downstream QAM channel. Each QAM channel has a carrier frequency that differs from the carrier frequency of the other channels. The transport streams are mapped according to a channel plan designed by the MSO that operates the network.

Figure 2:
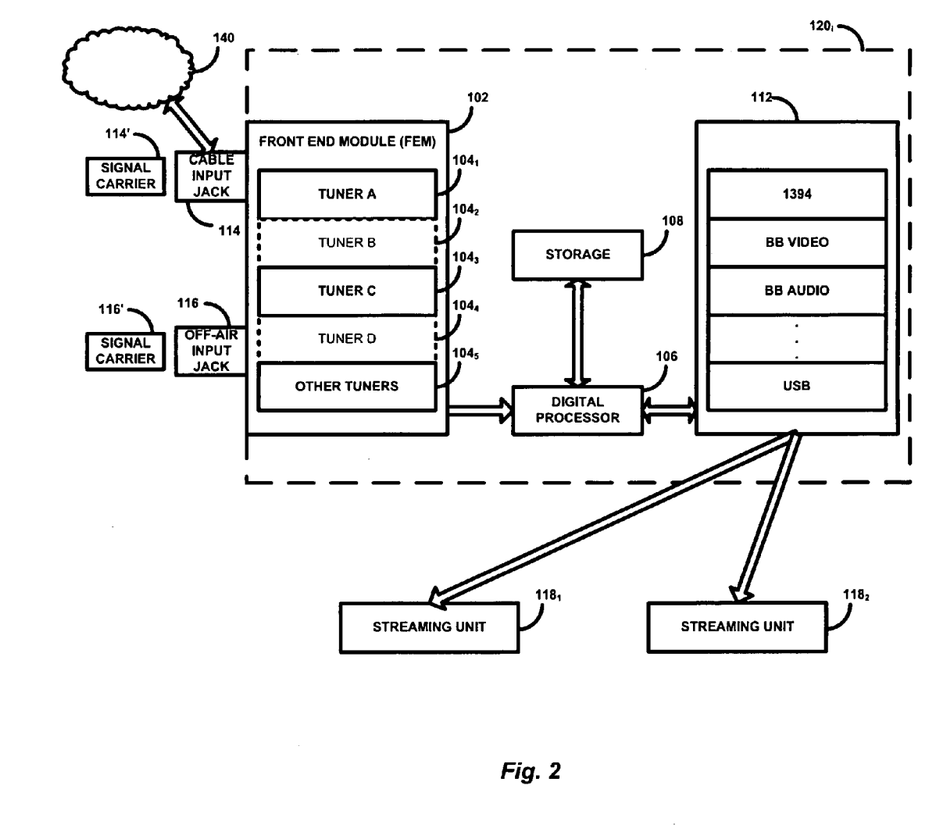
FIG. 2 shows one example of the hardware employed in a set-top terminal of FIG. 1, in accordance with an embodiment.

FIG. 2 shows one example of a set-top terminal $120_i$. The set-top terminal may receive a variety of types of video signals, such as cable channel signals and off-air channel signals. The set-top terminal $120_i$ generally includes a front end module (FEM) 102 (including a modulator/demodulator and tuners such as tuner $104_i$) for interfacing with the distribution network (e.g., HFC network 140) of FIG. 1, digital processor (s) 106, storage device 108, and a plurality of interfaces 112 (e.g., video/audio interfaces, IEEE-1394 "Firewire", USB, Ethernet, serial/parallel ports, etc.) for establishing communication with other end-user devices such as televisions, personal electronics, computers, WiFi or other network hubs/routers, etc. Other components which may be utilized within the device include one or more decoder stages, various processing layers (e.g., DOCSIS MAC, OOB channels, MPEG, etc.) as well as media processors and other specialized SoC or ASIC devices. These additional components and functionality are well known to those of ordinary skill in the art and accordingly are not described further herein.

As shown, the set-top terminal $120_i$ is a cable set-top box receiving video signals from a hybrid fiber-optic/coax cable network (indicated in FIG. 2 by signal carrier or cable 114' connected to a cable input jack 114) operated by a cable television operator, where the video signal is a multi-channel analog and/or digital programming source broadcast by the cable operator. Also as shown, the set-top terminal $120_i$ receives off-air channels as a separate video source, the source indicated by signal carrier 116', which is connected to an off-air input jack 116.

The set-top terminal $120_i$ may be any device or combination of devices capable of receiving and playing back the video signal. The video source may be any public or private, wired or wireless, video transmission infrastructure or technology, including but not limited to a fiber-optic network, a coaxial cable network, a hybrid network, a satellite network, a cellular network, the Internet, a television network, a radio network, a copper wire network, or any other existing or future transmission infrastructure or technology, operated by any type of program provider, such as a television network or station, a studio, an Internet broadcaster or service provider, a cable operator, or a satellite operator; and the video signal may be any pre-recorded or live analog or digital electronic signal representing an image and/or audio, in any format. The video signals may be transmitted by cable or off-air.

The set-top terminal $120_i$ includes external network connection/communication interfaces, which support devices such as modems, streaming media players and other network connection support devices and/or software, coupled through local or wide area networks (not shown) to program providers and providers of other content, such as advertising content.

The set-top terminal $120_i$ further includes two or more tuners, shown as tuners $104_1$-$104_5$, which tune to a channel signal selected by a consumer via a user interface (not shown). In a dual tuner system, e.g., just tuners A and C are employed. In a quad tuner system, tuners A-D are employed. Additional tuners may also be employed, as shown schematically by element $104_5$. Additional tuners may generally be operated in parallel in the scanning configurations to assist the dual, quad, or even tri-tuners to perform their scanning assignments.

The user interface may be any type of known or future device or technology allowing the consumer to select channels or programs the consumer wishes to receive, but is preferably a remote control, mouse, microphone, keyboard, or display associated with a personal video recorder.

The channel signal includes video and/or audio components that are demodulated to recover and display the original signal. The demodulator may be a 64/256 quadrature amplitude modulation demodulator, and may be responsive to receive a digital version of the channel signal. The demodulator identifies digital data packets from one or more digital sources, such as a Moving Pictures Experts' Group (MPEG) transport stream, a high-definition television stream, or a media stream from an external network connection, such as a cable modem, using well-known methods and techniques. Other demodulators, which may be, e.g., NTSC demodulators, are responsive to receive an analog version of the channel signal and to decode signals and markers according to well-known methods and techniques.

The video information may include raw video or audio data, arranged for formatting in accordance with a predetermined media format.

The storage medium 108 may be employed to receive, among other things, video signals for storage. The storage medium may be any local or remote device, now known or later developed, capable of recording data, including but not limited to a hard disk drive, a videocassette recorder tape, all types of optical storage media such as compact disks and digital videodisks, a magnetic tape, a home router, or a server.

Figure 3:
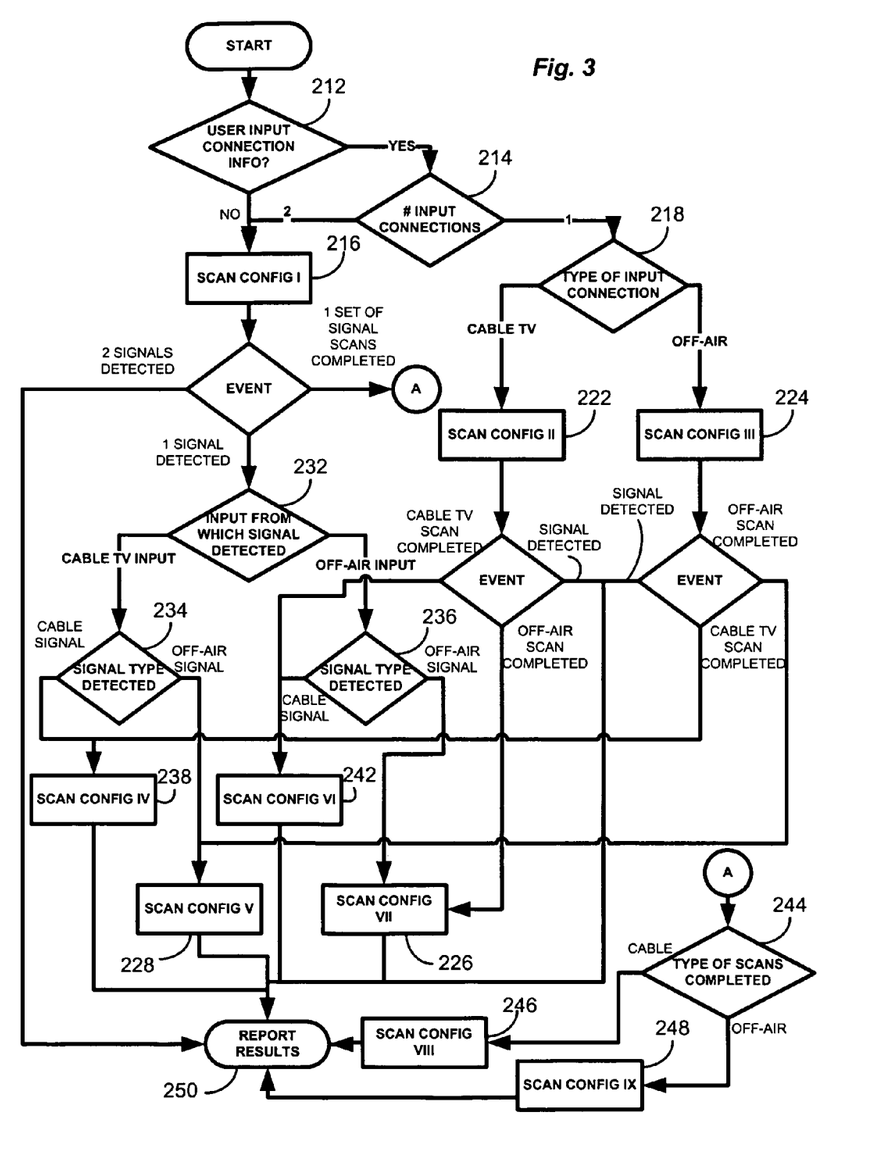
FIG. 3 is a flowchart illustrating a method for detection of cable and off-air signals in a dual or higher tuner set-top terminal, in accordance with an embodiment.

FIG. 3 is a flowchart that illustrates one implementation of a method for rapidly detecting cable and off-air signals in a dual or higher tuner set-top terminal. Table I illustrates the scanning configurations for an exemplary quad tuner implementation, while Table II illustrates the scanning configurations for an exemplary dual tuner implementation.

TABLE I

SCAN CONFIGURATIONS FOR A QUAD TUNER

| Scan configuration | Input and signal being scanned | FEM tuner assignment | | | |
|---|---|---|---|---|---|
| | | A | B | C | D |
| I | Input | Cable TV | Cable TV | Off Air | Off Air |
| | Signal | Cable TV | Off Air | Off Air | Cable TV |
| II | Input | Cable TV | Cable TV | Cable TV | Cable TV |
| | Signal | Cable TV | Cable TV | Off Air | Off Air |
| III | Input | Off Air | Off Air | Off Air | Off Air |
| | Signal | Off Air | Off Air | Cable TV | Cable TV |
| IV | Input | Off Air | Off Air | Off Air | Off Air |
| | Signal | Off Air | Off Air | Off Air | Off Air |
| V | Input | Off Air | Off Air | Off Air | Off Air |
| | Signal | Cable TV | Cable TV | Cable TV | Cable TV |
| VI | Input | Cable TV | Cable TV | Cable TV | Cable TV |
| | Signal | Off Air | Off Air | Off Air | Off Air |
| VII | Input | Cable TV | Cable TV | Cable TV | Cable TV |
| | Signal | Cable TV | Cable TV | Cable TV | Cable TV |
| VIII | Input | Cable TV | Cable TV | Off Air | Off Air |
| | Signal | Off Air | Off Air | Off Air | Off Air |
| IX | Input | Cable TV | Cable TV | Off Air | Off Air |
| | Signal | Cable TV | Cable TV | Cable TV | Cable TV |

TABLE II

SCAN CONFIGURATIONS FOR A DUAL TUNER

| Scan configuration | Input and signal being scanned | A | C |
|---|---|---|---|
| I | Input | Cable TV | Off Air |
| | Signal | Cable TV | Off Air |
| II | Input | Cable TV | Cable TV |
| | Signal | Cable TV | Off Air |
| III | Input | Off Air | Off Air |
| | Signal | Off Air | Cable TV |
| IV | Input | Off Air | Off Air |
| | Signal | Off Air | Off Air |
| V | Input | Off Air | Off Air |
| | Signal | Cable TV | Cable TV |
| VI | Input | Cable TV | Cable TV |
| | Signal | Off Air | Off Air |
| VII | Input | Cable TV | Cable TV |
| | Signal | Cable TV | Cable TV |
| VIII | Input | Cable TV | Off Air |
| | Signal | Off Air | Off Air |
| IX | Input | Cable TV | Off Air |
| | Signal | Cable TV | Cable TV |

The method employs a number of scan configurations. Each scan configuration is an assignment of each of the tuners; that is, each tuner is assigned to scan a given input jack for a given type of signal. In particular, each scan configuration involves a unique assignment of the set-top terminal's FEM tuners, and the set-top terminal FEM has the capability of assigning tuners to either a cable or an off-air coax input jack. Once a given scan has detected a signal, information and data about the signal, such as whether the same is a cable signal or an off-air signal, may be stored in an appropriate memory or medium. Other information may also be stored, such as the type of channel, e.g., STD, HRC, IRC, or the like.

For the scan configurations discussed, the appended Tables gives details of two particular implementations. The tuners have generally the same configuration, so, e.g., tuner A may be switched with tuner B in any given assignment, and so on, and the same results attained. Each tuner in a given scan configuration conducts a cable or off-air signal detection scan as denoted by the type of signal assigned it in the configuration. Moreover, each tuner in a given scan configuration conducts its signal detection scan from the input jack denoted for it, e.g., cable or off-air. For example, tuner A in scan configuration I in Table I is configured to scan for a cable signal on the cable input jack.

It is noted, however, that the above need not necessarily be the case in all implementations. For example, there may be one or more specific features associated with cable services such that, when cable services are used, it may be desireable to connect a certain tuner to the cable input as opposed to the off-air input. Similarly, there could be an analogous off-air capability not normally used for cable. For example, a particular cable input may be configured with an Out-Of-Band tuner function to support cable services, and this function may not be necessary on all tuners. Other differences may include tuning range or other specific tuner parameters.

A quad tuner configuration is now discussed with respect to FIG. 3 and Table I. A dual tuner configuration description follows, with respect to FIG. 3 and Table II. Extension to other numbers of tuners will be apparent given these teachings.

In the quad tuner configuration of Table I, four tuners are used to minimize the time required to complete the signal detection logic. For scan configuration I, each tuner conducts a unique scan as each is assigned a different input jack and signal for which to scan. However, for other scan configurations, signal detection scanning is combined between tuners that share the same input and signal assignment. For scan configuration II, tuners A and B conduct a joint scan for a cable signal on the cable input jack and tuners C and D conduct a joint scan for an off-air signal on the cable input jack. Scan configurations IV-VIII each employ four tuners for a single signal detection scan.

Joint scanning for signal detection among two or more tuners sharing the same input/signal assignment, i.e., a "tuner pool", is achieved by assigning the next queued frequency in the signal scan algorithm to the next available tuner in the tuner pool. When transitioning or "switching" to a new scan configuration, the scan queues for a given input/signal assignment in a prior scan configuration are retained if continuing with the same input/signal assignment in the new scan configuration, thus avoiding rescan delays. Since scan configurations I, II, and III are starting configurations, they begin with empty scan queues for each input/signal assignment to be scanned.

As seen in FIG. 3, following signal detection or a scan completion without a signal detection, the method transitions to the next step in the signal detection logic, which may be a new scan configuration to be run or a reporting of results. In the case of scan configuration I, an additional time period, e.g., several seconds, such as two seconds, may be employed following a signal detection or scan completion to allow for signal detection or scan completion of the same signal type in the other input jack. For example, if a cable signal was detected from the cable input jack, the method may wait several seconds to determine if a cable signal is also detected from the off-air input. In this way, a scenario is addressed in which a user inadvertently attaches two coaxial cables, both carrying cable signals or both carrying off-air signals, to both the cable and off-air input jacks.

The method of FIG. 3 starts with requesting user input or detecting if any user input has been provided (step 212). This is an optional step. If user input has been provided, the same may be employed to speed the detection process; however, no user input is required. The user input may be received by a user interface such as a remote control, a keyboard, or other input device, and the same may be located on a separate unit, on the set-top terminal, or on the output device such as a television or display screen. The user interface may also display information on the television or display screen, or on a separate screen on the set-top terminal. The information may provide guidance to the user on setup as well as to report results of the scanning procedures discussed below.

If user input has been provided, then the next step is to check if the user input has provided the number of signal carriers, e.g., coax cables, such as cable and off-air coax inputs, that have been attached to input connections (step 214). For example, the set-top terminal of FIG. 2 may have a cable input jack and an off-air input jack. To these jacks the user may have connected one coax cable or two coax cables (one to each jack). The user may be prompted to provide information about these connections, and may respond to the request, by using one of several types of user interfaces. For example, the set-top terminal may display the request on a television screen to which it is attached, and the user may respond by use of a remote control. Alternatively, the user may provide such input on a touch screen on the set-top terminal, or by entering information on a computing device coupled to the set-top terminal by any wired or wireless technique, or by any other technique by which data may be entered into the set-top terminal. To view the user interface, the user may view a display screen on the set-top terminal in some implementations.

Using any of the above methods, the user may inform the system whether a connection was made of one signal carrier to one jack, two signal carriers to two jacks, or whether no information was provided. In another implementation, the system may provide no prompt for any such information.

If the user has not provided any information, or if the user has indicated that two signal carriers have been attached to two input jacks, one off-air and one cable, then the system defaults to scan configuration I (step 216). In scan configuration I, two of the FEM tuners (in the Table, tuners A and B) scan the cable input jack; one (tuner A) scans for cable channels, and the other (tuner B) for off-air channels. Similarly, another two of the FEM tuners scan the off-air input jack; one scans for off-air channels, and the other for cable channels.

If, during performance of scan configuration I, a user indicates that they have connected a signal carrier to a particular input jack, then the method may transition to scan configuration II or III (explained in more detail below), instead of scan configuration I. For example, if a user indicates that a cable has been attached to the cable input jack or to the off-air input jack, then the scan configuration should transition to II or III, respectively. Even more optimally, and in an alternative implementation, the system may transition to a similar configuration that retains the same input jack/signal assignments but that replaces the wrong input assignments with the correct input assignments.

In the event that two signals are detected, then results may be reported (step 250) without further scans being performed. If just one signal is detected, then the next step is to check on which input jack the signal was detected (step 232). If the signal was detected on the cable input jack, then the next step is to determine what type of signal was detected, i.e., whether the detected signal was a cable signal or an off-air signal (step 234). If the detected signal was a cable signal, then the method switches to scan configuration IV (step 238). If the detected signal was an off-air signal, then the method switches to scan configuration V (step 228). In scan configuration IV, all the tuners check the off-air input jack for off-air signals, and in scan configuration V, all the tuners check the off-air input jack for cable signals. The joint scanning can be accomplished, and thus a more optimized scan run, because information was gained in the prior scan that eliminated certain possibilities.

On the other hand, following step 232, if the signal was detected on the off-air input jack, then again the next step is to determine what type of signal was detected, i.e., whether the detected signal was a cable signal or an off-air signal (step 236). If the detected signal was a cable signal, then the method switches to scan configuration VI (step 242). If the detected signal was an off-air signal, then the method switches to scan configuration VII (step 226). In scan configuration VI, all the tuners check the cable input jack for off-air signals, and in scan configuration VII, all the tuners check the cable input jack for cable signals. As above, the more optimized joint scanning can be run since certain possibilities have been eliminated.

Following any of scan configurations IV-VII, once the scan is completed or otherwise ceases, a report may be generated and results reported (step 250).

In the event that performance of scan configuration I (step 216) results in one set of signal scans being completed without a signal being detected, then the system may branch to step 244. In particular, a determination is made of which type of scan was completed (step 244). If the completed scan was a cable scan, then the method switches to scan configuration VIII (step 246). On the other hand, if the completed scan was a scan for off-air signals, then the method switches to scan configuration IX (step 248). In scan configuration VIII, two tuners check the cable input jack for off-air signals and the other two check the off-air input jack, also for off-air signals.

In scan configuration IX, two tuners check the cable input jack for cable signals and the other two check the off-air input jack, also for cable signals. As above, the more optimized joint scanning can be run since certain possibilities have been eliminated. In any case, once the scan is completed or otherwise ceases, a report may be generated and results reported (step 250).

In an alternate configuration, if the method is running scan configuration VIII, and if the user indicates during the running that a connection has been made to the cable input jack or the off-air input jack, then the method may transition to scan configuration VI or IV, respectively, to accelerate scan completion. Similarly, if the method is running scan configuration IX, and if the user indicates during the running that a connection has been made to the cable input jack or to the off-air input jack, then the method may transition to scan configuration VII or V, respectively, to accelerate scan completion.

Returning to step 212, if the user indicates that a cable or other signal carrier was attached to just one input jack, then a determination is made as to the type of input jack on which the connection was made (step 218). This step may be undertaken by receiving user input or by automatic detection, or both. If the result of step 218 indicates that a cable or other signal carrier was coupled to the cable input jack, then the method switches to scan configuration II (step 222), while if the result of step 218 indicates that a cable or other signal carrier was coupled to the off-air input jack, then the method switches to scan configuration III (step 222). In scan configuration II, all the tuners check the cable input jack, two for off-air signals and two for cable signals. In scan configuration III, all the tuners check the off-air input jack, two for off-air signals and two for cable signals.

Whether step 218 leads to scan configuration II or scan configuration III, if a signal is detected, the results may be reported and the method ended (step 250). In such a case, one cable has been attached to one jack and its signal detected. Accordingly, the method has finished.

If performance of step 222 leads to a completion of the scan for cable channels, without cable channels being detected, then the method switches to scan configuration VI (step 242). Similarly, if performance of step 222 leads to a completion of the scan for off-air channels, without off-air channels being detected, then the method switches to scan configuration VII (step 226).

Likewise, if performance of step 224 leads to a completion of the scan for cable channels, without cable channels being detected, then the method switches to scan configuration IV (step 238). Similarly, if performance of step 224 leads to a completion of the scan for off-air channels, without off-air channels being detected, then the method switches to scan configuration V (step 228).

As above, following any of scan configurations IV-VII, once the scan is completed or otherwise ceases, a report may be generated and results reported (step 250).

As noted above, Table II describes exemplary scanning configurations for a dual tuner system, where the tuners are listed as tuner "A" and tuner "C" in order to provide a ready comparison with the tuners in Table I. The process depicted by the flowchart of FIG. 3 is essentially the same with respect to the dual tuner system.

For any of the steps resulting in a report, the same may delivered via a display screen on an attached television, an LCD or other screen on the set-top terminal, an audio playback of results, or using any other such technique.

The above description of FIG. 3 details which scans are performed at which times given certain inputs. Various scanning algorithms may be employed for any given scan. For example, for conducting a cable television signal detection scan, the following algorithm may be employed, until such a point as a signal is detected, scanning is completed, or scanning is terminated according to signal detection logic (which may be prompted by signal detection or scan completion in a separate input or signal detection scan). First, a scan may be performed of EIA STD (CEA-542) and HRC (CEA-542) channels 24-135 alternating between STD and HRC frequencies on each channel. When on an STD and HRC channel, first an attempt is made to detect the QAM-64 signal, followed by the QAM-256 signal. In parallel, employing separate hardware, an attempt may be made to detect an NTSC signal. Next, a scan may be made of STD channels 2 to 23, IRC (CEA-542) channels 1, 5, and 6, and HRC channels 1 to 23, alternating between STD, IRC, and HRC frequencies when on a shared channel. As above, when on an STD, IRC, and HRC channel, first an attempt may be made to detect the QAM-64 signal, followed by the QAM-256 signal.

With the exception of STD channels 1, 4, and 5, IRC channels are at most 12.5 kHz offset from STD channels, and 12.5 kHz is within the frequency acquisition range used for scanning. This allows detection of all but the noted IRC channels when conducting STD channel detection too. Channel 1 is an exception because the same is not present in STD channels and channels 5 and 6 are exceptions because they are approximately 2 MHz offset from STD channels 4 and 5, respectively.

Likewise, for conducting an off-air television signal detection scan, the following algorithm may be employed, until such a point as a signal is detected, scanning is completed, or scanning is terminated according to signal detection logic (which may be prompted by signal detection or scan completion in a separate input or signal detection scan). First, a scan may be performed of off-air channels 51 down to 2 for 8-VSB demod signals. Next, off-air channels 69 down to 52 may be scanned for 8-VSB demod signals.

For both cable and off-air signal detection scans, the system may declare a signal detected when a demodulation lock occurs in a digitally-modulated signal or when vertical presentation (VPRES) is detected for a cable NTSC signal.

The above method substantially reduces signal detection time for a set-top terminal equipped with two or four tuners. However, the system may be employed with more tuners as well. In this case, each scan configuration may be provided with a larger tuner pool per input jack/signal assignment. For example, a set-top terminal with eight tuners may have two tuners per input jack/signal assignment in scan configuration I, four tuners per input jack/signal assignment in scan configuration II, III, VIII, and IX, and all eight tuners in the one input jack/scan assignment of scan configurations IV through VII.

It should be emphasized that the state processes depicted in FIG. 3 are presented for illustrative purposes only and that the methods, systems and techniques described herein more generally encompass any process for acquiring the information that needs to be obtained during scanning.

The processes described above, including but not limited to those presented in connection with FIG. 3, may be implemented in general, multi-purpose or single purpose processors. Such a processor will execute instructions, either at the assembly, compiled or machine-level, to perform that process. Those instructions can be written by one of ordinary skill in the art following the description presented above and may be stored or transmitted on a computer readable medium. The instructions may also be created using source code or any other known computer-aided design tool. A computer readable medium may be any medium capable of carrying those instructions and may include a CD-ROM, DVD, magnetic or other optical disc, tape, silicon memory (e.g., removable, non-removable, volatile or non-volatile), and packetized or non-packetized wireline or wireless transmission signals.

A method and apparatus has been described for minimizing cable and off-air signal detection on separate cable and off-air input jacks in a set-top terminal with four or more tuners. The systems and methods employ logic to progress through different scan configurations to minimize signal detection delay.

Although a specific architecture has been described herein, including specific functional elements and relationships, it is contemplated that the systems and methods herein may be implemented in a variety of ways. For example, functional elements may be packaged together or individually, or may be implemented by fewer, more or different devices, and may be either integrated within other products, or adapted to work with other products externally. When one element is indicated as being responsive to another element, the elements may be directly or indirectly coupled. In another variation, while the system and method have been described with respect to coaxial cables, the same may be employed with respect to any signal carrier, such fiber optics, hybrid cables, and the like.

It will furthermore be apparent that other and further forms of the invention, and embodiments other than the specific embodiments described above, may be devised without departing from the spirit and scope of the appended claims and their equivalents, and it is therefore intended that the scope of this invention will only be governed by the following claims and their equivalents.

The invention claimed is:

1. A method for scanning signals received by a set-top terminal on one or more signal carriers that have been attached to a cable input jack and/or an off-air input jack of the set-top terminal, the set-top terminal having at least two tuners, the cable input jack being configured to receive signals carried on a cable signal carrier, and the off-air input jack being configured to receive signals carried on an off-air signal carrier, comprising:

scanning the cable input jack with a first of the tuners for a series of cable channels; and scanning the off-air input jack with a second of the tuners for a series of off-air channels, wherein the scanning of the cable input jack and the scanning of the off-air input jack are performed concurrently, wherein if two signals are detected during the concurrent scanning of the off-air input jack and the cable input jack, then further comprising reporting a first result responsive to the concurrent scanning, and wherein if only one signal is detected during the scans of the off-air input jack and the cable input jack, further comprising:

concurrently scanning one input jack with at least two tuners, the scanning of one input jack comprising:

if the one signal is detected on the cable input jack, and:

if the one signal detected is a cable channel, then scanning the off-air input jack with the at least two tuners for a series of off-air channels, and reporting a first result responsive to the concurrently scanning one input jack;

if the one signal detected is an off-air channel, then scanning the off-air input jack with the at least two tuners for a series of cable channels, and reporting a second result responsive to the concurrently scanning one input jack;

if the one signal is detected on the off-air input jack, and:

if the one signal detected is a cable channel, then scanning the cable input jack with the at least two tuners for a series of off-air channels, and reporting a third result responsive to the concurrently scanning one input jack; and if the one signal detected is an off-air channel, then scanning the cable input jack with the at least two tuners for a series of cable channels, and reporting a fourth result responsive to the concurrently scanning one input jack.

2. The method of claim 1, further comprising receiving user input prior to the scanning, wherein the user input indicates that signal carriers have been attached to respective ones of the cable and off-air input jacks of the set-top terminal.

3. The method of claim 1, wherein if no signal is detected during the scanning of the cable input jack with the first tuner for a series of cable channels, then further comprising scanning the cable input jack with one of the tuners for a series of off-air channels and concurrently scanning the off-air input jack with one of the tuners for a series of off-air channels, and reporting a first result.

4. The method of claim 1, wherein if no signal is detected during the scanning of the off-air input jack with the second tuner for a series of off-air channels, then further comprising scanning the cable input jack with one of the tuners for a series of cable channels and concurrently scanning the off-air input jack with one of the tuners for a series of cable channels, and reporting a first result.

5. The method of claim 1, wherein the set-top terminal has at least four tuners, and further comprising:

a. scanning the off-air input jack with a third of the tuners for a series of cable channels; and b. concurrently scanning the cable input jack with a fourth of the tuners for a series of off-air channels.

6. The method of claim 5, wherein if only one signal is detected during the scans of the off-air input jack and the cable input jack, further comprising:

if the one signal is detected on the cable input jack, and:

if the one signal detected is a cable channel, then scanning the off-air input jack with the at least four tuners concurrently, each of the at least four tuners respectively scanning for a separate series of off-air channels, and reporting a first result;

if the one signal detected is an off-air channel, then scanning the off-air input jack with the at least four tuners concurrently, each of the at least four tuners respectively scanning for a separate series of cable channels, and reporting a second result;

if the one signal is detected on the off-air input jack, and:

if the one signal detected is a cable channel, then scanning the cable input jack with the at least four tuners concurrently, each of the at least four tuners respectively scanning for a separate series of off-air channels, and reporting a third result; and if the one signal detected is an off-air channel, then scanning the cable input jack with the at least four tuners concurrently, each of the at least four tuners respectively scanning for a separate series of cable channels, and reporting a fourth result.

7. The method of claim 5, wherein if no signal is detected during the scanning of the cable input jack with the first tuner for a series of cable channels or during the scanning of the off-air input jack with the third tuner for a series of cable channels, then further comprising scanning the cable input jack with at least two of the tuners for a series of off-air channels and concurrently scanning the off-air input jack with at least two of the tuners for a series of off-air channels, and reporting a first result.

8. The method of claim 5, wherein if no signal is detected during the scanning of the off-air input jack with the second tuner for a series of off-air channels or during the scanning of the cable input jack with the fourth tuner for a series of off-air channels, then further comprising scanning the cable input jack with at least two of the tuners for a series of cable channels and concurrently scanning the off-air input jack with at least two of the tuners for a series of cable channels, and reporting a first result.

9. A method for scanning signals received by a set-top terminal on one or more signal carriers that have been attached to a cable input jack and/or an off-air input jack of the set-top terminal, the set-top terminal having at least two tuners, the cable input jack being configured to receive signals carried on a cable signal carrier, and the off-air input jack being configured to receive signals carried on an off-air signal carrier, comprising:
   receiving user input, wherein the user input indicates that a signal carrier has been attached to only one of the cable input jack or the off-air input jack of the set-top terminal; and
   scanning one input jack with at least two tuners, the scanning of one input jack comprising performing a first series of scans, the first series including scanning the respective cable input jack or off-air input jack concurrently with at least two of the tuners, wherein at least one of the tuners scans for a series of cable channels and at least one of the tuners concurrently scans for a series of off-air channels, further wherein the scanning of the respective cable input jack or off-air input jack for the series of cable channels or off-air channels is performed concurrently by at least two tuners.

10. The method of claim 9, further comprising, following the first series of scans:
   if the scanning of the respective cable input jack or off-air input jack with the at least one of the tuners for a series of cable channels results in a signal being detected, then reporting a first result responsive to the concurrent scanning;
   if the scanning of the respective cable input jack or off-air input jack with the at least one of the tuners for a series of cable channels results in the scan being completed with no signal being detected, then scanning the respective cable input jack or off-air input jack with the at least two tuners concurrently for a series of off-air channels, and reporting a second result responsive to the concurrent scanning; and
   if the scanning of the respective cable input jack or off-air input jack with the at least one of the tuners for a series of off-air channels results in the scanning being completed with no signal being detected, then scanning the respective cable input jack or off-air input jack with the at least two tuners concurrently for a series of cable channels, and reporting a third result responsive to the concurrent scanning.

11. A set-top terminal, comprising:
   a cable input jack for receipt of signals carried on a cable signal carrier;
   an off-air input jack for receipt of signals carried on an off-air signal carrier;
   at least two tuners for receiving the signals from the cable input jack and the off-air input jack;
   a user interface for receiving a user input; and
   a processor configured to perform a first series of scans if the user interface has not received a user input or if the user input indicates that signal carriers have been attached to respective ones of the cable and off-air input jacks of the set-top terminal, the first series of scans including:
      scanning the cable input jack with a first of the tuners for a series of cable channels; and
      scanning the off-air input jack with a second of the tuners for a series of off-air channels,
      wherein the scanning of the cable input jack and the scanning of the off-air input jack are performed concurrently,
      wherein if two signals are detected during the first series of concurrent scans, the processor is further configured to report a first result responsive to the concurrent scanning;
   and wherein the processor is further configured to:
      perform a second series of scans if the user input indicates that a signal carrier has been attached to only one of the cable input jack or the off-air input jack, the second series of scans including scanning the respective cable input jack or off-air input jack with one of the tuners for a series of cable channels and concurrently scanning the respective cable input jack or off-air input jack with one of the tuners for a series of off-air channels;
      report a first result responsive to the concurrent scanning if, following the performing of the second series of scans, the scanning of the respective cable input jack or off-air input jack with one of the tuners for a series of cable channels results in a signal being detected;
      scan the respective cable input jack or off-air input jack with the at least two tuners concurrently for a series of off-air channels, and report a second result responsive to the concurrent scanning, if, following the performing of the second series of scans, the scanning of the respective cable input jack or off-air input jack with one of the tuners concurrently for a series of cable channels results in the scan being completed with no signal being detected; and
      scan the respective cable input jack or off-air input jack with the at least two tuners concurrently for a series of cable channels, and report a third result responsive to the concurrent scanning, if, following the performing of the second series of scans, the scanning of the respective cable input jack or off-air input jack with one of the tuners concurrently for a series of off-air channels results in the scan being completed with no signal being detected.

12. A set-top terminal, comprising:
   a cable input jack for receipt of signals carried on a cable signal carrier;
   an off-air input jack for receipt of signals carried on an off-air signal carrier;
   at least two tuners for receiving the signals from the cable input jack and the off-air input jack;
   a user interface for receiving a user input; and
   a processor configured to perform a first series of scans if the user interface has not received a user input or if the user input indicates that signal carriers have been attached to respective ones of the cable and off-air input jacks of the set-top terminal, the first series of scans including:
      scanning the cable input jack with a first of the tuners for a series of cable channels; and scanning the off-air input jack with a second of the tuners for a series of off-air channels, wherein the scanning of the cable input jack and the scanning of the off-air input jack are performed concurrently, wherein if two signals are detected during the first series of concurrent scans, the processor is further configured to report a first result responsive to the concurrent scanning;

and wherein the processor is further configured to perform a third series of scans if only one signal is detected during the first series of scans, the third series of scans including:

if the one signal is detected on the cable input jack, and:
if the one signal detected is a cable channel, then scanning the off-air input jack with the at least two tuners concurrently for a series of off-air channels, and reporting a first result responsive to the concurrent scanning;
if the one signal detected is an off-air channel, then scanning the off-air input jack with the at least two tuners concurrently for a series of cable channels, and reporting a second result responsive to the concurrent scanning;

if the one signal is detected on the off-air input jack, and:
if the one signal detected is a cable channel, then scanning the cable input jack with the at least two tuners concurrently for a series of off-air channels, and reporting a third result responsive to the concurrent scanning; and
if the one signal detected is an off-air channel, then scanning the cable input jack with the at least two tuners concurrently for a series of cable channels, and reporting a fourth result responsive to the concurrent scanning.

13. The set-top terminal of claim 12, wherein if no signal is detected during the scanning of the cable input jack with the first tuner for a series of cable channels, the processor is further configured to: scan the cable input jack with one of the tuners for a series of off-air channels, scan the off-air input jack with one of the tuners concurrently for a series of off-air channels, and report a first result responsive to the concurrent scanning.

14. The set-top terminal of claim 12, wherein if no signal is detected during the scanning of the off-air input jack with the second tuner for a series of off-air channels, the processor is further configured to: scan the cable input jack with one of the tuners for a series of cable channels, scan the off-air input jack with one of the tuners concurrently for a series of cable channels, and report a first result responsive to the concurrent scanning.

15. A set-top terminal, comprising:
a cable input jack for receipt of signals carried on a cable signal carrier;
an off-air input jack for receipt of signals carried on an off-air signal carrier;
at least four tuners for receiving the signals from the cable input jack and the off-air input jack;
a user interface for receiving a user input; and
a processor configured to perform a first series of scans if the user interface has not received a user input or if the user input indicates that signal carriers have been attached to respective ones of the cable and off-air input jacks of the set-top terminal, the first series of scans including:
scanning the cable input jack with a first of the tuners for a series of cable channels; and
scanning the off-air input jack with a second of the tuners for a series of off-air channels, wherein the scanning of the cable input jack and the scanning of the off-air input jack are performed concurrently, and wherein if two signals are detected during the first series of concurrent scans, the processor is further configured to report a first result responsive to the concurrent scanning;

and wherein the processor is further configured to perform:
scanning the off-air input jack with a third of the tuners for a series of cable channels;
scanning the cable input jack with a fourth of the tuners concurrently for a series of off-air channels; and
a second series of scans if the user input indicates that a signal carrier has been attached to only one of the cable input jack or the off-air input jack, the second series of scans including scanning the respective cable input jack or off-air input jack with the at least two of the tuners for a series of cable channels and scanning the respective cable input jack or off-air input jack with the at least two of the tuners concurrently for a series of off-air channels.

16. The set-top terminal of claim 15, wherein the processor is further configured to:
report a first result responsive to the concurrent scanning if, following the performing of the second series of scans, the scanning of the respective cable input jack or off-air input jack with the at least two of the tuners for a series of cable channels results in a signal being detected;
scan the respective cable input jack or off-air input jack with the at least four tuners concurrently for a series of off-air channels, and report a second result responsive to the concurrent scanning, if, following the performing of the second series of scans, the scanning of the respective cable input jack or off-air input jack with the at least two of the tuners for a series of cable channels results in the scan being completed with no signal being detected; and
scan the respective cable input jack or off-air input jack with the at least four tuners concurrently for a series of cable channels, and report a third result responsive to the concurrent scanning, if following the performing of the second series of scans, the scanning of the respective cable input jack or off-air input jack with the at least two of the tuners for a series of off-air channels results in the scan being completed with no signal being detected.

17. The set-top terminal of claim 15, wherein if two signals are detected during the first series of scans, the processor is further configured to report a first result responsive to the concurrent scanning.

18. The set-top terminal of claim 15, wherein the processor is further configured to perform a third series of scans if only one signal is detected during the first series of scans, the third series of scans including:
if the one signal is detected on the cable input jack, and:
if the one signal detected is a cable channel, then scanning the off-air input jack with the at least four tuners concurrently for a series of off-air channels, and reporting a first result responsive to the concurrent scanning;
if the one signal detected is an off-air channel, then scanning the off-air input jack with the at least four tuners concurrently for a series of cable channels, and reporting a second result responsive to the concurrent scanning;
if the one signal is detected on the off-air input jack, and:
if the one signal detected is a cable channel, then scanning the cable input jack with the at least four tuners concurrently for a series of off-air channels, and reporting a third result responsive to the concurrent scanning; and if the one signal detected is an off-air channel, then scanning the cable input jack with the at least four tuners concurrently for a series of cable channels, and reporting a fourth result responsive to the concurrent scanning.

19. The set-top terminal of claim 15, wherein if no signal is detected during the scanning of the cable input jack with the first tuner for a series of cable channels or during the scanning of the off-air input jack with the third tuner for a series of cable channels, the processor is further configured to: scan the cable input jack with at least two of the tuners concurrently for a series of off-air channels, scan the off-air input jack with at least two of the tuners concurrently for a series of off-air channels, and report a first result responsive to the concurrent scanning.

20. The set-top terminal of claim 15, wherein if no signal is detected during the scanning of the off-air input jack with the second tuner for a series of off-air channels or during the scanning of the cable input jack with the fourth tuner for a series of off-air channels, the processor is further configured to: scan the cable input jack with at least two of the tuners concurrently for a series of cable channels, scan the off-air input jack with at least two of the tuners concurrently for a series of cable channels, and report a first result responsive to the concurrent scanning.

21. At least one non-transitory computer-readable medium, encoded with instructions which, when executed by a processor, cause a set-top terminal to perform a method of scanning television channel signals, the set-top terminal having a cable input jack, an off-air input jack, and at least two tuners, the cable input jack being configured to receive signals carried on a cable signal carrier, and the off-air input jack being configured to receive signals carried on an off-air signal carrier, where one or more signal carriers have been attached to respective ones of the cable or off-air input jacks by a user, the method comprising:

scanning the cable input jack with a first of the tuners for a series of cable channels; and scanning the off-air input jack with a second of the tuners for a series of off-air channels, wherein the scanning of the cable input jack and the scanning of the off-air input jack are performed concurrently, wherein if two signals are detected during the concurrent scanning of the off-air input jack and the cable input jack, then further comprising reporting a first result responsive to the concurrent scanning, and wherein if only one signal is detected during the scans of the off-air input jack and the cable input jack, further comprising:

concurrently scanning one input jack with at least two tuners, the scanning of one input jack comprising:

if the one signal is detected on the cable input jack, and:
if the one signal detected is a cable channel, then scanning the off-air input jack with the at least two tuners for a series of off-air channels, and reporting a first result responsive to the concurrently scanning one input jack;
if the one signal detected is an off-air channel, then scanning the off-air input jack with the at least two tuners for a series of cable channels, and reporting a second result responsive to the concurrently scanning one input jack;

if the one signal is detected on the off-air input jack, and:
if the one signal detected is a cable channel, then scanning the cable input jack with the at least two tuners for a series of off-air channels, and reporting a third result responsive to the concurrently scanning one input jack; and
if the one signal detected is an off-air channel, then scanning the cable input jack with the at least two tuners for a series of cable channels, and reporting a fourth result responsive to the concurrently scanning one input jack.

22. At least one non-transitory computer-readable medium, encoded with instructions which, when executed by a processor, cause a set-top terminal to perform a method of scanning television channel signals, the set-top terminal having a cable input jack, an off-air input jack, and at least two tuners, the cable input jack being configured to receive signals carried on a cable signal carrier, and the off-air input jack being configured to receive signals carried on an off-air signal carrier, where one or more signal carriers have been attached to respective ones of the cable or off-air input jacks by a user, the method comprising:

receiving user input, wherein the user input indicates that a signal carrier has been attached to only one of the cable input jack or the off-air input jack of the set-top terminal; and scanning one input jack with at least two of the tuners, the scanning of one input jack comprising scanning the respective cable input jack or off-air input jack with at least two of the tuners, wherein at least one of the tuners scans for a series of cable channels and at least one of the tuners scans concurrently for a series of off-air channels, further wherein the scanning of the respective cable input jack or off-air input jack for a series of cable channels or off-air channels is performed concurrently by at least two tuners.

\* \* \* \* \*